Figures 1, 2, 3, 4:
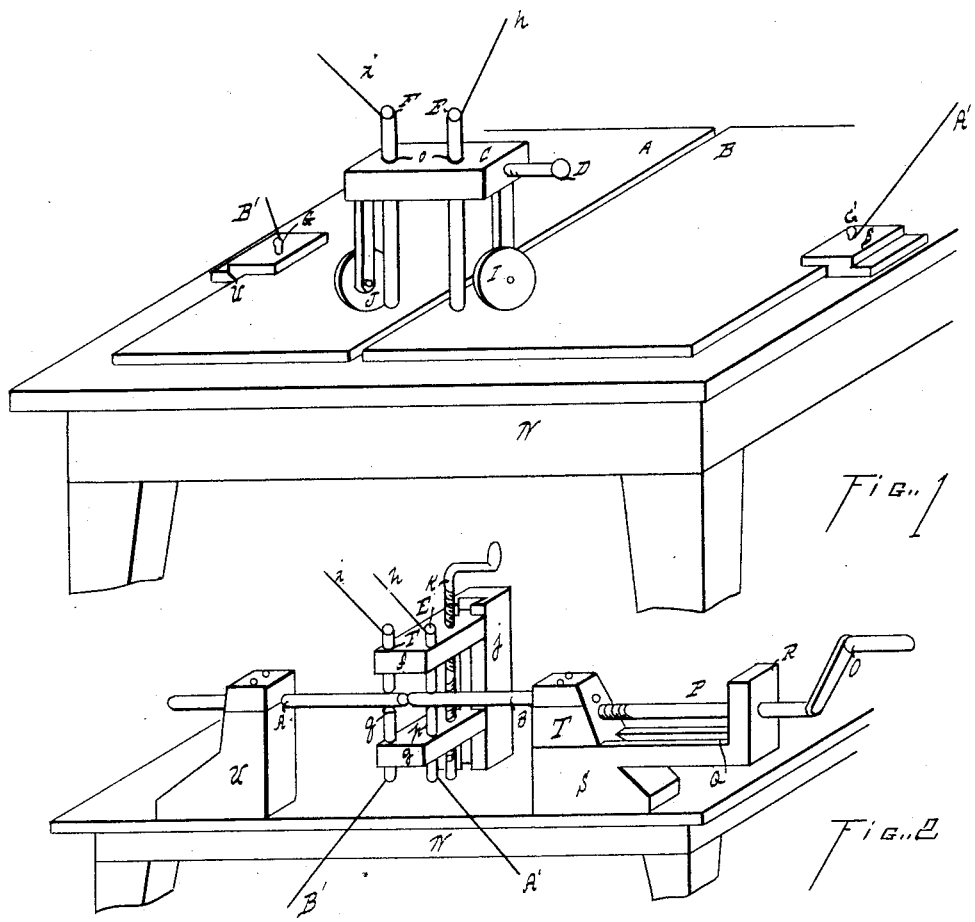

(No Model.)

C. L. COFFIN.
METHOD OF WELDING METALS BY ELECTRICITY.

No. 423,734.   Patented Mar. 18, 1890.

Witnesses

Inventor
Charles L. Coffin

UNITED STATES PATENT OFFICE.

CHARLES L. COFFIN, OF DETROIT, MICHIGAN.

METHOD OF WELDING METALS BY ELECTRICITY.

SPECIFICATION forming part of Letters Patent No. 423,734, dated March 18, 1890.

Application filed November 19, 1889. Serial No. 330,828. (No model.)

*To all whom it may concern:*

Be it known that I, CHARLES L. COFFIN, of Detroit, in the county of Wayne and State of Michigan, have invented a new and useful Improvement in the Method of Welding Metals Electrically, of which the following is a specification.

My invention consists of a process of welding metals electrically, hereinafter fully described and claimed.

The drawings illustrate mechanism which may be used to practice my invention, Figures 1 and 2 being perspective views, Fig. 3 an elevation of a portion of the mechanism, and Fig. 4 a small top plan view of a portion of the conductor-support.

The principle of my invention consists in heating the edge of an article to be welded by passing a heating-current of electricity through the articles near the edge to be heated.

N represents a table, usually of some insulating material, as wood.

U and S represent clamps supported on said table.

In the mechanism shown in Fig. 1 the article to be welded is connected with one pole of a generator, while with the mechanism shown in Fig. 2 it is not so connected.

Referring to Fig. 1, A and B are two metal plates to be welded, the plate A being connected with the conductor B' and binding-post G with one pole of a generator, while the plate B is connected by binding-post G' and conductor A' with the other pole of a generator.

C represents a block provided with a handle D and resting on two rollers I and J, preferably of insulating material, which run on the articles on a metal plate A and B. (Shown in the drawings.) If the wheels I J are not of insulating material, they should be in some way insulated from block C.

E and F represent two conductors, (carbon, for instance,) which pass through block C, being insulated therefrom by the insulating material $o$, and rest upon the plates A and B.

$h$ and $i$ represent electrical conductors, which connect the carbons E and F with the poles of a generator of electricity.

The conductors B' and $i$ must be of opposite polarity, and the conductors A' and $h$ must be of opposite polarity; but with this limitation it is immaterial how said four conductors are connected with the poles of the generator or generators which supply the current.

The operation of my invention is as follows: Assuming conductors A' B' to be connected with the positive pole of a generator, and the conductors $h$ and $i$ to be connected with the negative pole, the current flowing in through conductor A' will traverse binding-post G', plate B, and conductors E and $h$, thus heating the edge of plate B at its point of contact with conductor E. The current entering through B' will traverse plate A and conductor F and $i$, thus heating the edge of plate A at its point of contact with conductor F. By means of the traveling block C the conductors E and F may be moved along the plates B and A to heat the whole edge of each plate, and when said edges are brought to a welding heat the weld is formed by forcing the plates A and B together.

As shown in Fig. 2, the articles A and B to be welded are not directly connected with the generator; but instead of this the conductor B' is connected with the conductor $q$ similarly to and opposite conductor F, and the conductor A' is connected with a conductor $p$ similar to and opposite conductor E, the two pairs of conductors F $q$ and E $p$ being brought into contact with the point of contact with the conductors as above described.

For the purpose of readily bringing the conductors in contact with the articles to be welded, any suitable mechanism may be followed. That which I have illustrated for the purpose of complying with the rules of the Patent Office is a standard $j$, supported on and rising from the table N and having a dovetailed groove in its forward side.

$f$ and $g$ represent two blocks the ends of which are fitted to engage with the dovetailed groove in standard $j$, and which may be brought together or moved apart by the right and left hand screw-threaded shaft K, tapped through both of said blocks. The conductors E and F pass through and are carried by the block $g$, all of said conductors being insulated from the block which carries them by a ring of insulating material $o$, as shown in Fig. 4. It is evident that by turning the screw-shaft K the four conductors E, F, $p$, and $q$ can be brought into or turned out of contact with the articles A and B.

For pressing A and B together to form the weld, any suitable mechanism may be used; but that which I have illustrated is as follows: The lower part of clamp S has a grooved extension Q, terminating in an upright arm. The upper part of said clamp S, (marked T,) is adapted to slide in the groove in the extension Q. P represents a screw-shaft swiveled in the upright arm R and tapped into the movable part T of clamp S. O represents a crank by which screw-shaft P can be turned. Rotating said screw-shaft P moves clamp T longitudinally, whereby the article B may be pressed against or withdrawn from the article A. To permit either A or B to slide freely between the conductors, the arrangement of Fig. 3 may be used, in which the conductors E F $p$ $q$ terminate in rollers, which permit either A or B to slide backward or forward while in contact with said conductors.

What I claim as my invention, and desire to secure by Letters Patent, is—

The herein-described process of welding metals electrically, consisting in separately heating the edge of each article to be welded by passing a heating-current through said article in proximity to the edge to be welded and forming the weld by pressing the heated edges together.

CHARLES L. COFFIN.

Witnesses:
 CYRUS E. LOTHROP,
 GERTRUDE ANDERSON.